United States Patent
Ishida et al.

(10) Patent No.: US 11,530,564 B2
(45) Date of Patent: Dec. 20, 2022

(54) ASSIST APPARATUS FOR ASSISTING USER TO GET OUT OF VEHICLE

(71) Applicant: TOYOTA JIDOSHA KABUSHIKI KAISHA, Toyota (JP)

(72) Inventors: Masaho Ishida, Toyota (JP); Noriyuki Saitoh, Nisshin (JP); Yuki Hatsude, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/173,464

(22) Filed: Feb. 11, 2021

(65) Prior Publication Data
US 2021/0254385 A1   Aug. 19, 2021

(30) Foreign Application Priority Data
Feb. 13, 2020   (JP) .............................. JP2020-022250

(51) Int. Cl.
| | |
|---|---|
| E05F 15/00 | (2015.01) |
| E05F 15/40 | (2015.01) |
| B60Q 5/00 | (2006.01) |
| E05F 15/70 | (2015.01) |
| E05F 15/60 | (2015.01) |
| E05B 81/06 | (2014.01) |
| E05B 81/56 | (2014.01) |
| E05B 79/20 | (2014.01) |

(52) U.S. Cl.
CPC .............. *E05F 15/40* (2015.01); *B60Q 5/005* (2013.01); *E05B 79/20* (2013.01); *E05B 81/06* (2013.01); *E05B 81/56* (2013.01); *E05F 15/60* (2015.01); *E05F 15/70* (2015.01); *E05Y 2201/434* (2013.01); *E05Y 2400/32* (2013.01); *E05Y 2400/44* (2013.01); *E05Y 2400/54* (2013.01); *E05Y 2900/531* (2013.01)

(58) Field of Classification Search
CPC ........... E05F 15/60; E05F 15/40; E05F 15/70; E05B 81/06; E05B 81/56; E05B 83/40; E05B 79/20; E05C 17/006; B60Q 9/008; B60Q 5/005; E05Y 2201/434; E05Y 2400/32; E05Y 2400/54; E05Y 2400/44; E05Y 2400/45; E05Y 2900/531
USPC .............................................. 49/26, 27, 28
See application file for complete search history.

(56) References Cited

U.S. PATENT DOCUMENTS

| | | | |
|---|---|---|---|
| 9,636,978 B2 * | 5/2017 | Warburton | ............ E05F 15/622 |
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,525,850 B1 * | 1/2020 | Tang | .................... B60N 2/0248 |
| 10,696,297 B2 | 6/2020 | Nguyen Van et al. | |
| 11,001,255 B2 | 5/2021 | Fukuman et al. | |

(Continued)

FOREIGN PATENT DOCUMENTS

| | | |
|---|---|---|
| CN | 109863048 A | 6/2019 |
| JP | 2018-8576 A | 1/2018 |

(Continued)

*Primary Examiner* — Chi Q Nguyen
(74) *Attorney, Agent, or Firm* — Sughrue Mion, PLLC

(57) ABSTRACT

An assist apparatus for assisting a user or an occupant of a vehicle to get out of the vehicle, the assist apparatus configured to be capable of opening a door of the vehicle automatically upon a request operation for opening the door by the user.

2 Claims, 9 Drawing Sheets

(56) References Cited

U.S. PATENT DOCUMENTS

| | | |
|---|---|---|
| 11,110,937 B2 | 9/2021 | Kinoshita et al. |
| 11,247,635 B1* | 2/2022 | Salter ..................... B60R 25/24 |
| 2002/0189168 A1* | 12/2002 | Sicuranza ............... E05C 17/00 |
| | | 340/552 |
| 2016/0026191 A1* | 1/2016 | Fujimoto ................ E05F 15/73 |
| | | 701/49 |
| 2018/0202212 A1* | 7/2018 | Xiao ..................... E05F 15/611 |
| 2018/0238099 A1* | 8/2018 | Schatz .................. E05F 15/622 |
| 2019/0145150 A1 | 5/2019 | Kidena et al. |
| 2019/0284851 A1 | 9/2019 | Miyashiro et al. |
| 2020/0018111 A1* | 1/2020 | Akbarian ............... G01S 13/931 |
| 2020/0043494 A1* | 2/2020 | Maeng .................. G06N 3/088 |
| 2020/0157873 A1* | 5/2020 | Sabatini ................ B60Q 1/323 |

FOREIGN PATENT DOCUMENTS

| | | |
|---|---|---|
| JP | 2018-69769 A | 5/2018 |
| JP | 2019-90246 A | 6/2019 |

\* cited by examiner

ASSIST APPARATUS FOR ASSISTING USER TO GET OUT OF VEHICLE

BACKGROUND

Field

The present disclosure relates to an assist apparatus for assisting a user (an occupant) of a vehicle to get out of (leave) the vehicle, the assist apparatus configured to be capable of opening a door of the vehicle automatically upon a request operation for opening the door by the user.

Description of the Related Art

A known assist apparatus installed on a vehicle opens and closes a door of the vehicle in such a manner that each of an opening angle and a closing angle of the door does not exceeds a predetermined restriction angle when an object that is approaching the vehicle is present (refer to Japanese Patent Application. Laid-Open. No. 2018-8576).

Hereinafter, the object that is approaching the vehicle is referred to as an "approaching object".

Meanwhile, there is a vehicle configured to open a sliding door automatically, when a request operation for opening the sliding door by a user is detected. In this vehicle, it is desirable that, even when the request operation is detected, the sliding door be held at a fully closed position if the approaching object is present. Likewise, it is desirable that a swing door of a vehicle configured to open and close the swing door automatically be held at the fully closed position if the approaching object is present.

However, for instance, when the vehicle has stopped/parked in a heavy traffic area, approaching objects are successively detected. When this happens, the vehicle that is configured to hold the door (the sliding door/the normal swing door) at the fully closed position when the approaching object is present can hardly open the door automatically.

Whereas, even when the approaching object is successively detected, there may be a timing/chance where the user is aware of presence of the approaching object and can safely open the door and get out of (leave) the vehicle through the opened door. However, in the above-described vehicle, the door continues to be held at the fully closed position even when the user performs the request operation (a user's door opening request operation) at the above described timing. Consequently, there may be a case where the user feels that the assistance for leaving the vehicle described above is annoying, because the user cannot smoothly get out of the vehicle.

SUMMARY

The present disclosure has been made in order to cope with the above-described problem. That is, one of objects of the present disclosure is to provide an "assist apparatus for assisting a user of a vehicle" capable of reducing a possibility that the user feels that the assistance for leaving the vehicle is annoying. Hereinafter, the assist apparatus according to the present disclosure may sometimes be referred to as the "present disclosed assist apparatus".

The present disclosed assist apparatus comprises:

a door drive device (10) configured to perform door opening operation for opening a door (11RL, 11RR) automatically, the door opening and closing a door opening part through which the user gets in and out of the vehicle (SV), the door opening part formed in a body of the vehicle;

an operation detection device (22) configured to detect a user's door opening request operation performed by the user for opening the door when the door is at a fully closed position to fully close the door opening part;

information acquisition device (21) configured to obtain peripheral object information on an object present in a peripheral area of the vehicle; and a control unit (20) configured to control the door drive device.

The control unit is configured to:

determine, based on the peripheral object information, whether or not an attention-required object to which the user should pay attention when the user gets out of the vehicle through the door opening part is present (step 220, step 520);

perform a door opening operation process to cause the door drive device to perform the door opening operation (step 225, step 525) when it is determined that the attention-required object is not present (step 220, step 520) in a case where the user's door opening request operation has been detected (step 215, step 515);

perform a door opening operation restriction process to hold the door at the fully closed position (step 240, step 540) when it is determined that the attention-required object is present (step 220: Yes, step 520: Yes) in a case where the users door opening request operation has been detected (step 215, step 515); and perform the door opening operation process in place of the door opening operation restriction process (step 225, step 525) even when it is determined that the attention-required object is present (step 220: Yes, step 520: Yes) in a case where the user's door opening request operation is detected after the door opening operation restriction process has been successively performed a predetermined number of times (step 215: No, step 235: No, step 235: No, step 515: No, step 535: No).

Accordingly, even when the user performs the users door opening request operation the predetermined number of times in a situation where the attention-required object such as an approaching object that is approaching the vehicle is continuously detected, the present disclosed assist apparatus performs the door opening operation restriction process to thereby hold the door at the fully closed position. Furthermore, if the user performs the user's door opening request operation after the user's door opening request operation is performed the predetermined number of times, the door opening operation process is performed, and thus, the door is automatically opened even when the attention-required object is detected at that time point. Therefore, for instance, in the present disclosed assist apparatus, if the user performs the user's door opening request operation multiple times in order to open the door after the user becomes aware of presence of the attention-required object, the door is automatically opened. Consequently, the present disclosed assist apparatus can reduce a possibility that the user finds the door opening operation restriction process annoying owing to the continuous execution of the door opening operation restriction process.

One of aspects of the present disclosed assist apparatus further comprises an alert device (30a, 30b, 31) capable of performing either a first alert or a second alert selectively. Each of the first alert and the second alert has alert ability of alerting the user to the presence of the attention-required object. The alert ability of the second alert has been designed to be lower than that of the first alert.

In the above aspect of the present disclosed assist apparatus, the control unit is configured to:

cause the alert device to perform the first alert when performing the door opening operation restriction process (step 230 shown in FIG. 8, step 530 shown in FIG. 9); and cause the alert device to perform the second alert when performing the door opening operation process in place of the door opening operation restriction process (step 810 shown in FIG. 8, step 910 shown in FIG. 9).

Therefore, the above-described aspect can reduce a possibility that the user finds the alert (the second alert) annoying, wherein the alert (second alert) is performed when the user performs the user's door opening request operation multiple times in order to open the door after the user becomes/is aware of the presence of the attention-required object.

Notably, in the above description, in order to facilitate understanding of the present disclosure, the constituent elements or parameters of the disclosure corresponding to those of an embodiment of the disclosure that will be described later are accompanied by parenthesized names and/or symbols that are used in the embodiment. However, the constituent elements or parameters of the present disclosure are not limited to those in the embodiment defined by the names and/or the symbols.

DESCRIPTION OF THE PREFERRED EMBODIMENTS

An assist apparatus for assisting a user of a vehicle to get out of (leave) the vehicle through a door according to each of embodiments of the present disclosure will next be described with reference to the drawings. It should be noted that a common reference is given to the same or the corresponding parts/elements throughout the drawings.

First Embodiment (Configuration)

Figure 1:
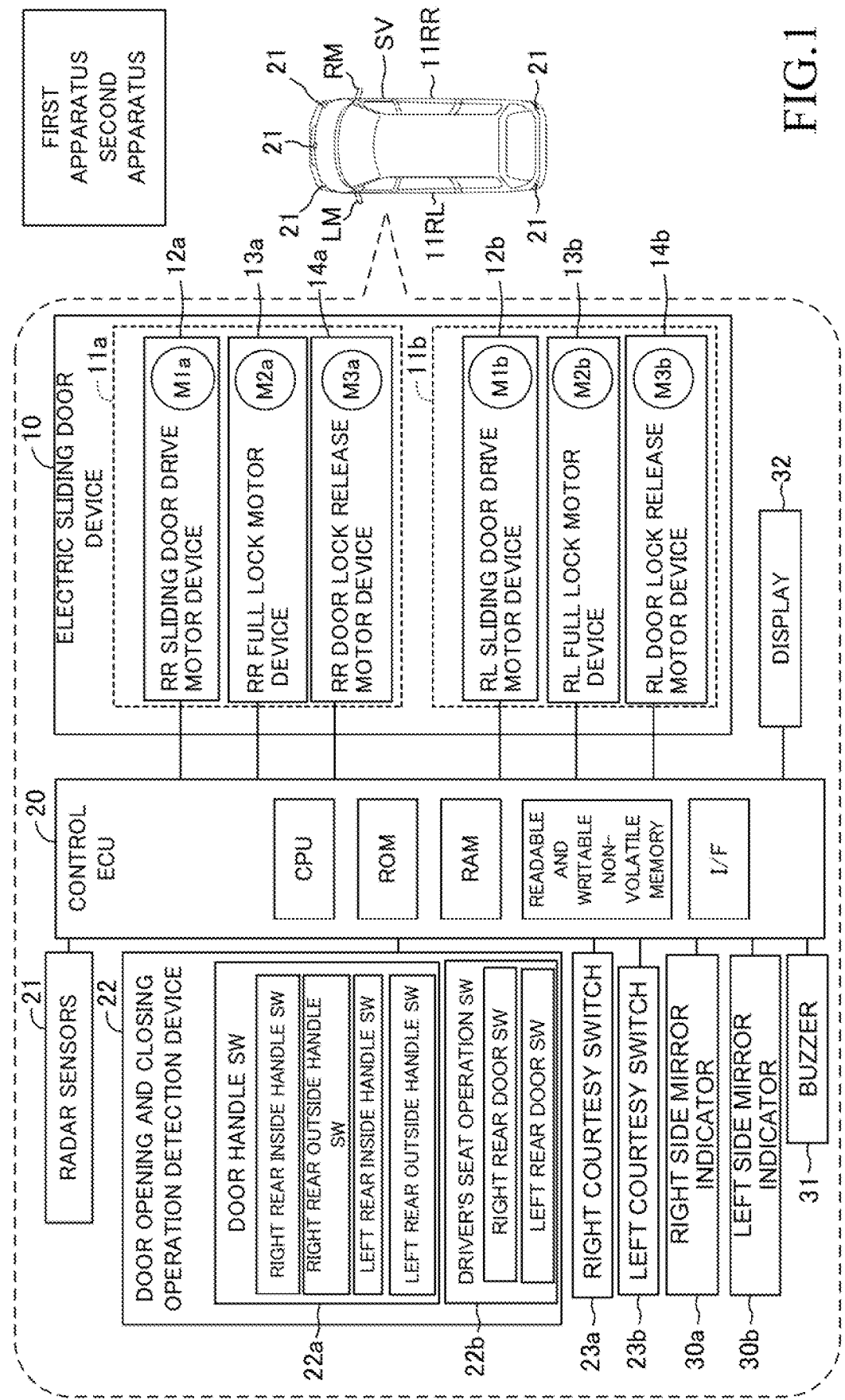
FIG. 1 is a schematic diagram of an assist apparatus (a first apparatus) for assisting a user of a vehicle to get out of the vehicle according to a first embodiment of the present disclosure.

As shown in FIG. 1, the assist apparatus (hereinafter, referred to as a "first apparatus") according to a first embodiment of the present disclosure is installed on a vehicle SV.

The first apparatus includes an electric sliding door device 10, a control ECU 20, radar sensors 21, a door opening and closing operation detection device 22, a right courtesy switch 23*a*, a left courtesy switch 23*b*, a right side mirror indicator 30*a*, a left side mirror indicator 30*b*, a buzzer 31, and a display 32.

The electric sliding door device 10 includes a right rear sliding door device 11*a* and a left rear sliding door device 11*b*.

The right rear sliding door device lie is a device for opening and closing a right rear sliding door 11RR. The right rear sliding door device 11*a* includes a right rear sliding door drive motor device 12*a*, a right rear full lock motor device 13*a*, and a right rear door lock release motor device 14*a*. A well-known door opening and closing handle (hereinafter, referred to as a "right rear inside handle") that is unillustrated is provided on a vehicle cabin side (an inside of the vehicle SV) of the right rear sliding door 11RR. A well-known door opening and closing handle (hereinafter, referred to as a "right rear outside handle") that is unillustrated is provided on a vehicle outside (an outside of the vehicle SV) of the right rear sliding door 11RR. The right rear inside handle and the right rear outside handle are operated by a user of the vehicle SV in order for the user to open and close the right rear sliding door 11RR.

The left rear sliding door device 11*b* is a device for opening and closing a left rear sliding door 11RL. The left rear sliding door device 11*b* includes a left rear sliding door drive motor device 12*b*, a left rear full lock motor device 13*b*, and a left rear door lock release motor device 14*b*. A well-known door opening and closing handle (hereinafter, referred to as a "left rear inside handle") that is unillustrated is provided on a vehicle cabin side (the inside of the vehicle SV) of the left rear sliding door 11RL. A well-known door opening and closing handle (hereinafter, referred to as a "left rear outside handle") that is unillustrated is provided on a vehicle outside (the outside of the vehicle SV) of the left rear sliding door 11RL. The left rear inside handle and the left rear outside handle are operated by the user of the vehicle SV in order for the user to open and close the left rear sliding door 11RL.

The right rear sliding door 11RR and the left rear sliding door 11RL have the same structure except that they are symmetrical with respect to a center axis extending in a front-rear direction of the vehicle SV. Therefore, each of them may sometimes be referred to as a "sliding door 11R": hereinafter.

The sliding door 11R is attached to a body of the vehicle SV so as to be capable of sliding (moving) in the front-rear direction of the vehicle SV in between a fully closed position and a fully opened position. The fully closed position is a position of the sliding door 11R where the sliding door 11R closes fully a door opening part (the door opening part through which the user to get in and get out of the vehicle SV) corresponding to the sliding door 11R and formed by the body of the vehicle SV. The fully opened position is a position of the sliding door 11R where the door opening part is maximally opened. A state where the sliding door 11R is at the fully closed position is referred to as a "fully closed state". A state where the sliding door 11R is at the fully opened position is referred to as a "fully opened state".

When the sliding door 11R is at the fully closed position, a well-known lock mechanism (not shown) allows the sliding door 11R to be locked. A state where the sliding door 11R has been locked at the fully closed position is referred to as a "fully closed locked state", for convenience. When the sliding door 11R is at the fully opened position, a well-known fully opened stopper mechanism (not shown) allows the sliding door 11R to be locked (held) at the fully opened position. A state where the sliding door 11R is held at the fully opened position is referred to as a "fully opened held state", for convenience.

The right rear sliding door device 11a and the left rear sliding door device 11b have the same configuration as each other. Therefore, the right rear sliding door device 11a and the left rear sliding door device 11b are individually (or collectively) referred to as a "sliding door device 11", hereinafter. Similarly, the right rear sliding door drive motor device 12a and the left rear sliding door drive motor device 12b are individually referred to as a "door drive motor device 12". The right rear full lock motor device 13a and the left rear full lock motor device 13b are individually referred to as a "full lock motor device 13". The right rear door lock release motor device 14a and the left rear door lock release motor device 14b are individually referred to as a "door lock release motor device 14". A door drive motor M1a included in the right rear sliding door drive motor device 12a and a door drive motor M1b included in the left rear sliding door drive motor device 12b are individually referred to as a "door drive motor M1". A full lock motor M2a included in the right rear full lock motor device 13a and a full lock motor M2b included in the left rear full lock motor device 13b are individually referred to as a "full lock motor M2". A release motor M3a included in the right rear door lock release motor device 14a and a release motor M3b included in the left rear door lock release motor device 14b are individually referred to as a "release motor M3".

The door drive motor device 12 is configured to be capable of moving the sliding door 11R in a door opening direction and a door closing direction. The door opening direction is a direction in which the sliding door 11R moves from the fully closed position to the fully opened position. In this embodiment, the door opening direction is a rear direction of the vehicle SV. The door closing direction is a direction in which the sliding door 11R moves from the fully opened position to the fully closed position. In this embodiment, the door closing direction is a front direction of the vehicle SV.

The door drive motor device 12 includes the door drive motor M1 and a door moving mechanism (not shown). The door drive motor M1 is driven using an electric power supplied, from a power source (e.g., an on-vehicle battery) of the vehicle SV. The door drive motor device 12 rotates the door drive motor M1 in a first direction to thereby move the sliding door 11R in the door opening direction through the door moving mechanism. The door drive motor device 12 rotates the door drive motor M1 in a "second direction opposite to the first direction" to thereby move the sliding door 11R in the door closing direction through the door moving mechanism.

The full lock motor device 13 includes the full lock motor M2 that is driven using the electric power supplied from the electric power source of the vehicle SV. The full lock motor device 13 rotates a latch (not shown) of the lock mechanism through driving of the full lock motor M2, so as to change a state of the sliding door 11R at the fully closed position to the fully closed locked state.

The door lock release motor device 14 includes the release motor M3 and cables (not shown). The release motor M3 is driven using the electric power supplied from the power source of the vehicle SV. The door lock release motor device 14 can release the fully closed locked state through the cables by driving of the release motor M3. Furthermore, the door lock release motor device 14 can release the fully opened held state through the cables by driving of the release motor M3.

The control ECU 20 is an electric control unit comprising a microcomputer as a main part. The control ECU 20 is also referred to as a "controller". The control ECU 20 and the other ECUs (not shown) are connected with each other via a CAN (Controller Area Network) so that they are capable of mutually transmitting and receiving information. The microcomputer includes a CPU, a ROM, a RAM, a readable and writable non-volatile memory, an interface I/F, and the like. The CPU realizes various functions by executing instructions (programs, routines) stored in the ROM. It should be noted that the control ECU 20 may be implemented by a plurality of ECUs.

The control ECU 20 is connected to the radar sensors 21, the door opening and closing operation detection device 22, the right courtesy switch 23a, and the left courtesy switch 23b. The control ECU 20 is configured to receive signals from them.

The radar sensors 21 are known target object detection sensors using are electric wave (hereinafter, referred to as a "millimeter wave") in a millimeter waveband. The radar sensors 21 obtain radar sensor target object information for specifying a distance Dr between the vehicle SV and a three-dimensional object (also referred to as an object or a target object) present in surroundings (a peripheral area) of the vehicle SV, a relative speed Vr of the three-dimensional object with respect to the vehicle SV, a relative position (a direction) of the three-dimensional object with respect to the vehicle SV, and the like. The radar sensor target object information is also referred to as "peripheral object information".

The radar sensors 21 are disposed at a center of a front end part of the vehicle SV, a left end of the front end part of the vehicle SV, a right end of the front end part of the vehicle SV, a left end of a rear end part of the vehicle SV, and a right end of the rear end part of the vehicle SV, respectively. Therefore, the radar sensors 21 are capable of obtaining the radar sensor target object information on the three-dimensional object (the object) present in the peripheral area of the vehicle SV.

The door opening and closing operation detection device 22 includes a door handle switch 22a and a driver's seat operation switch 22b.

The door handle switch 22a includes a right rear inside handle switch for detecting an operation of the right rear inside handle, a right rear outside handle switch for detecting an operation of the right rear outside handle, a left rear inside handle switch for detecting an operation of the left rear inside handle, and a left rear outside handle switch for detecting an operation of the left outside handle. Hereinafter, those switches included in the door handle switch 22a are individually referred to as a "handle switch". Hereinafter, those handles are individually referred to as a "handle". The handle switch generates an ON signal while the handle corresponding to the handle switch is being operated (in a state where the handle is operated). The handle switch generates an OFF signal while the handle corresponding to the handle switch is not being operated (in a state where the handle is not operated). For instance, the right rear inside handle switch generates the ON signal while the right rear inside handle is being operated and generates the OFF signal while the right rear inside handle is not being operated.

When the control ECU 20 has continued receiving the ON signal from the handle switch for a predetermined time or more, the control ECU 20 determines that the user of the vehicle SV has operated the handle corresponding to the handle switch (i.e., detects the handle operation by the user). For instance, when the control ECU 20 has continued receiving the ON signal from the right rear inside handle switch for the predetermined time or more, the control ECU 20 determines that the user has operated the right rear inside handle.

The driver's seat operation switch 22b is an operation switch that is provided near a driver's seat. The driver's seat operation switch 22b includes a right rear door switch that is operated in order for the user to open and close the right rear sliding door 11RR and a left rear door switch that is operated in order for the user to open and close the left rear sliding door 11RL. Hereinafter, the right rear door switch and the left rear door switch are individually referred to as a "door switch". The door switch is positioned at an OFF position in an initial state (a state where it is not operated by the user). The door switch at the OFF position is set to/moved to an ON position through an operation (a pressing operation onto the door switch) by the user. When the driver releases the operation (the pressing operation) to the door switch that has been at the ON position, the door switch moves upward so as to return to the OFF position. The door switch generates an ON signal when it is at the ON position and generates an OFF signal when it is at the OFF position.

When the control ECU 20 has continued receiving the ON signal from the door switch for a predetermined time or more, the control ECU 20 determines that the door switch has been operated by the user (i.e., detects the operation (a switch operation) to the door switch by the user). For instance, when the control ECU 20 has continued receiving the ON signal from the right rear door switch for the predetermined time or more, the control ECU 20 determines that the right rear door switch has been operated by the user.

Hereinafter, the handle operation that is detected based on the signal from the handle switch and the switch operation that is detected based on the signal from the door switch may individually be referred to as a "user's door operation" in some cases. Furthermore, the user's door operation for the right rear sliding door 11RR that has been at the fully closed position is referred to as a "user's door opening operation for the right rear sliding door 11RR" or a "user's door opening request operation for the right rear sliding door 11RR" in some cases. The user's door operation for the left rear sliding door 11RL that has been at the fully closed position is referred to as a "user's door opening operation for the left rear sliding door 11RL" or the "user's door opening request operation for the left rear sliding door 11RL" in some cases.

The right courtesy switch 23a generates a signal corresponding to an opened state of the right rear sliding door 11RR and a signal corresponding to a closed state of the right rear sliding door 11RR. Specifically, the right courtesy switch 23a generates an ON signal when the right rear sliding door 11RR is at the fully closed position and generates an OFF signal when the right rear sliding door 11RR is not at the fully closed position.

The left courtesy switch 23b generates a signal corresponding to an opened state of the left rear sliding door 11RL and a signal corresponding to a closed state of the left rear sliding door 11RL. Specifically, the left courtesy switch 23b generates an ON signal when the left rear sliding door 11RL is at the fully closed position and generates an OFF signal when the left rear sliding door 11RL is not at the fully closed position.

The door drive motor M1a has a rotation position detection sensor (not shown) that detects a rotation position of it. The door drive motor M1b has a rotation position detection sensor (not shown) that detects a rotation position of it. The control ECU 20 obtains a movement direction, a movement speed, and a present door position of the right rear sliding door 11RR based on the signal from the rotation position detection sensor of the door drive motor M1a. The control ECU 20 obtains a movement direction, a movement speed, and a present door position of the left rear sliding door 11RL based on the signal from the rotation position detection sensor of the door drive motor M1b.

Furthermore, the control ECU 20 is connected to the right side mirror indicator 30a, the left side mirror indicator 30b, the buzzer 31, and the display 32.

The right side mirror indicator 30a is disposed at a predetermined position in a right side mirror RM of the vehicle SV such that the user can see. The right side mirror indicator 30a is configured to turn on or off a lamp of a predetermined color (e.g., a red lamp or a yellow lamp) depending on an instruction from the control ECU 20.

The left side mirror indicator 30b is disposed at a predetermined position in a left side mirror LM of the vehicle SV such that the user can see. The left side mirror indicator 30b is configured to turn on or off a lamp of a predetermined color (e.g., a red lamp or a yellow lamp) depending on an instruction from the control ECU 20.

The buzzer 31 is disposed at a predetermined position in a vehicle cabin of the vehicle SV. The control ECU 20 makes the buzzer 31 generate a sound to thereby be able to alert the user.

The display 32 is a multi-information display arranged in front of the driver's seat. The display 32 displays various information and predetermined images in addition to measured values/detected values such as a vehicle speed and an engine rotation speed.

The control ECU 20 is connected to the electric sliding door device 10 and transmits various driving signals to the electric sliding door device 10 based on the user's door operation, to thereby cause the sliding door 11R to perform door opening operation and door closing operation.

Hereinafter, the door opening operation and the door closing operation of the right rear sliding door 11RR will be specifically described. It should be noted that the door opening operation and the door closing operation of the left rear sliding door 11RL are the same as the door opening operation and the door closing operation of the right rear sliding door 11RR except for switches, motors, and the like that relate to the door opening operation and the door closing operation. Therefore, detailed descriptions on the door opening operation and the door closing operation of the left rear sliding door 11RL will be omitted.

<Door Opening Operation Process>

When the control ECU 20 has detected the user's door operation for the right rear sliding door 11RR in a case where the right rear sliding door 11RR is in the fully closed locked state, the control ECU 20 drives the release motor M3a to thereby release the fully closed locked state.

Thereafter, the control ECU 20 rotates the door drive motor M1a in the first direction to move the right rear sliding door 11RR in the door opening direction to the fully opened position. When the right rear sliding door 11RR reaches the fully opened position, the control ECU 20 stops driving the door drive motor M1a. In this case, the right rear sliding door 11RR is held at the fully opened position by the fully opened stopper mechanism. That is, a state of the right rear sliding door 11RR is held at the fully opened held state. The process performed as mentioned above is the door opening operation process for the right rear sliding door 11RR.

<Door Closing Operation Process>

When the control ECU 20 has detected the users door operation for the right rear sliding door 11RR in a case where the right rear sliding door 11RR is in the fully opened held state, the control ECU 20 drives the release motor M3a to thereby release the fully opened held state. Thereafter, the control ECU 20 rotates the door drive motor M1a in the second direction to move the right rear sliding door 11RR in the door closing direction to the fully closed position.

When the right rear sliding door 11RR reaches the fully closed position, the control ECU 20 stops driving the door drive motor M1a and drives the full lock motor M2a to change a state of the right rear sliding door 11RR to the fully closed locked state. The process performed as mentioned above is the door closing operation process for the right rear sliding door 11RR.

<Outline of Operation>

When the user's door opening request operation has been detected, the control ECU 20 usually opens one or both of the right rear sliding door 11RR and the left rear sliding door 11RL automatically. However, before the sliding door 11R starts to be actually opened, the control ECU 20 determines whether or not the object to which the user should pay attention is present in the peripheral area of the vehicle SV when the user gets out of the vehicle (i.e., the user leaves the vehicle) through the door opening part corresponding to the sliding door 11R that the user intends to open. Hereinafter, the object to which the user should pay attention may sometimes be referred to as an "attention-required object".

Specifically, when the user's door operation for the right rear sliding door 11RR that has been in the fully closed locked state has been detected (i.e., the user's door opening request operation for the right rear sliding door 11RR in the fully closed locked state has been detected), the control ECU 20 operates in the manner described below.

When the control ECU 20 determines that the attention-required object for the right rear sliding door 11RR is not present, the control ECU 20 performs the door opening operation of the right rear sliding door 11RR (i.e., performs the door opening operation process).

When the control ECU 20 determines that the attention-required object for the right rear sliding door 11RR is present, the control ECU 20 restricts the door opening operation of the right rear sliding door 11RR (i.e., performs a door opening operation restriction process).

The door opening operation restriction process of the right rear sliding door 11RR is a process to hold/keep the right rear sliding door 11RR at the fully closed position without moving the right rear sliding door 11RR in the door opening direction (i.e., without driving the door drive motor M1a) even when the user's door opening request operation for the right rear sliding door 11RR has been detected. In this embodiment, when the control ECU 20 performs the door opening operation restriction process for the right rear sliding door 11RR, the control ECU 20 drives the release motor M3a to release the fully closed locked state. However, releasing the fully closed lock state does not necessarily have to be included in the door opening operation restriction process.

The control ECU 20 counts the number of times ("the restriction number of times of the door opening operation of the right rear sliding door 11RR") of successively performing the door opening operation restriction process for the user's door operation of the right rear sliding door 11RR. "The restriction number of times of the door opening operation of the right rear sliding door 11RR" can also be referred to as "the number of times for the user's door opening request operation for the right rear sliding door 11RR to be ignored". Then, when the users door opening request operation for the right rear sliding door 11RR is newly detected after "the restriction number of times of the door opening operation of the right rear sliding door 11RR" reaches a predetermined number of times (a threshold number of times), the control ECU 20 performs the door opening operation process for the right rear sliding door 11RR. That is, in this case, even when the control ECU 20 has determined that the attention-required object for the right rear sliding door 11RR is present, the control ECU 20 performs the door opening operation process for the right rear sliding door 11RR to open the right rear sliding door 11RR.

The control ECU 20 also performs either the door opening operation process or the door opening operation restriction process for the left rear sliding door 11RL in the same manner as the right rear sliding door 11RR.

That is, when the user's door operation (i.e., the user's door opening request operation) for the left rear sliding door 11RL that has been in the fully closed locked state has been detected, the control ECU 20 operates as described below.

When the control ECU 20 determines that the attention-required object for the left rear sliding door 11RL is not present, the control ECU 20 performs the door opening operation of the left rear sliding door 11RL (performs the door opening operation process).

When the control ECU 20 determines that the attention-required object for the left rear sliding door 11RL is present, the control ECU 20 restricts the door opening operation (i.e., performs the door opening operation restriction process) to hold the left rear sliding door 11RL at the fully closed position.

Then, when the user's door opening request operation for the left rear sliding door 11RL is newly detected after "the restriction number of times of the user's door opening request operation of the left rear sliding door 11RL" reaches a predetermined number of times (a threshold number of times), the control ECU 20 performs the door opening operation process for the left rear sliding door 11RL. That is, in this case, even when the control ECU 20 has determined that the attention-required object for the left rear sliding door 11RL is present, the control ECU 20 performs the door opening operation process for the left rear sliding door 11RL to open the left rear sliding door 11RL.

<Specific Operation>

Figure 2:
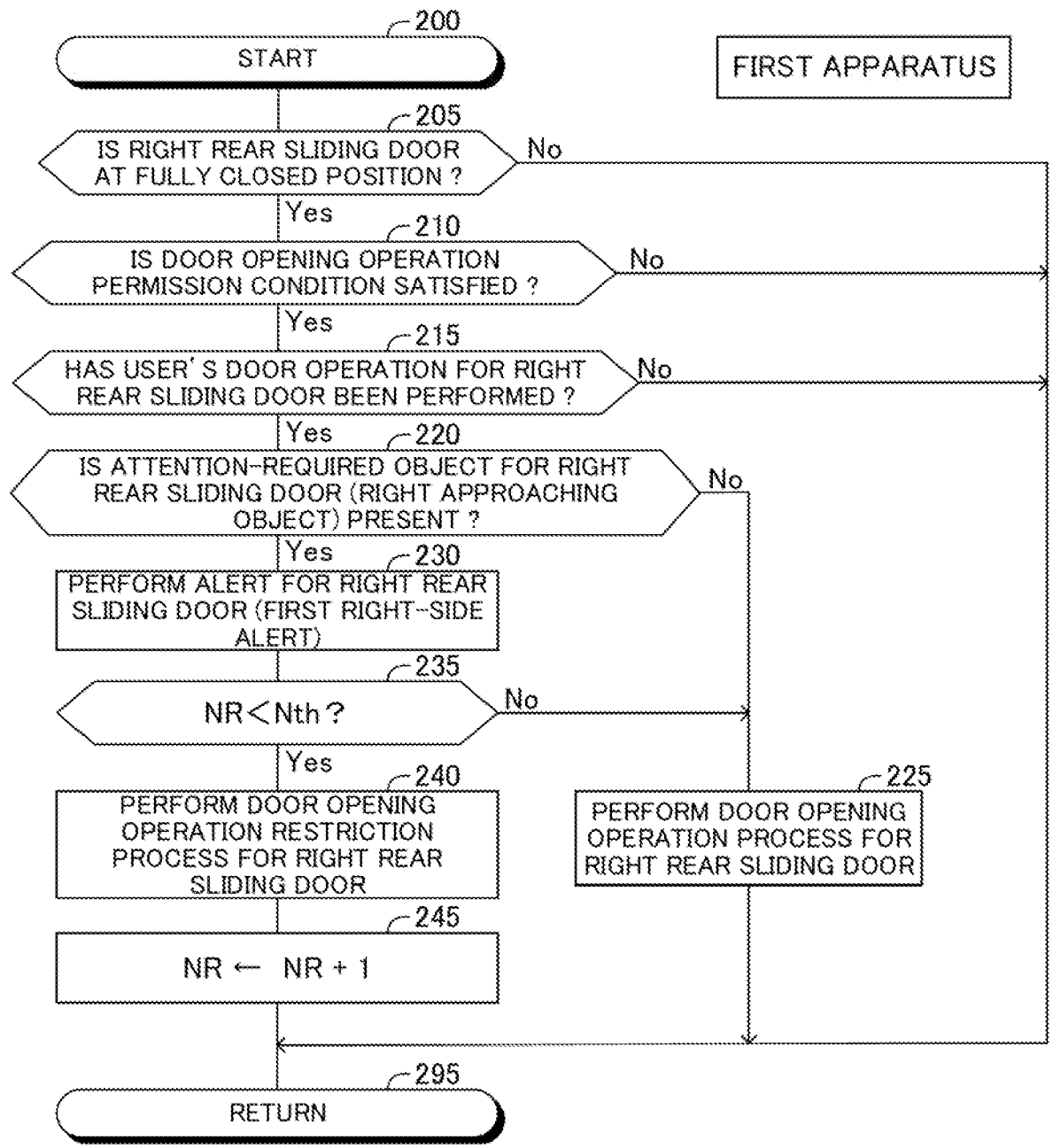
FIG. 2 is a flowchart representing a routine executed by a CPU shown in FIG. 1.
Figure 3:
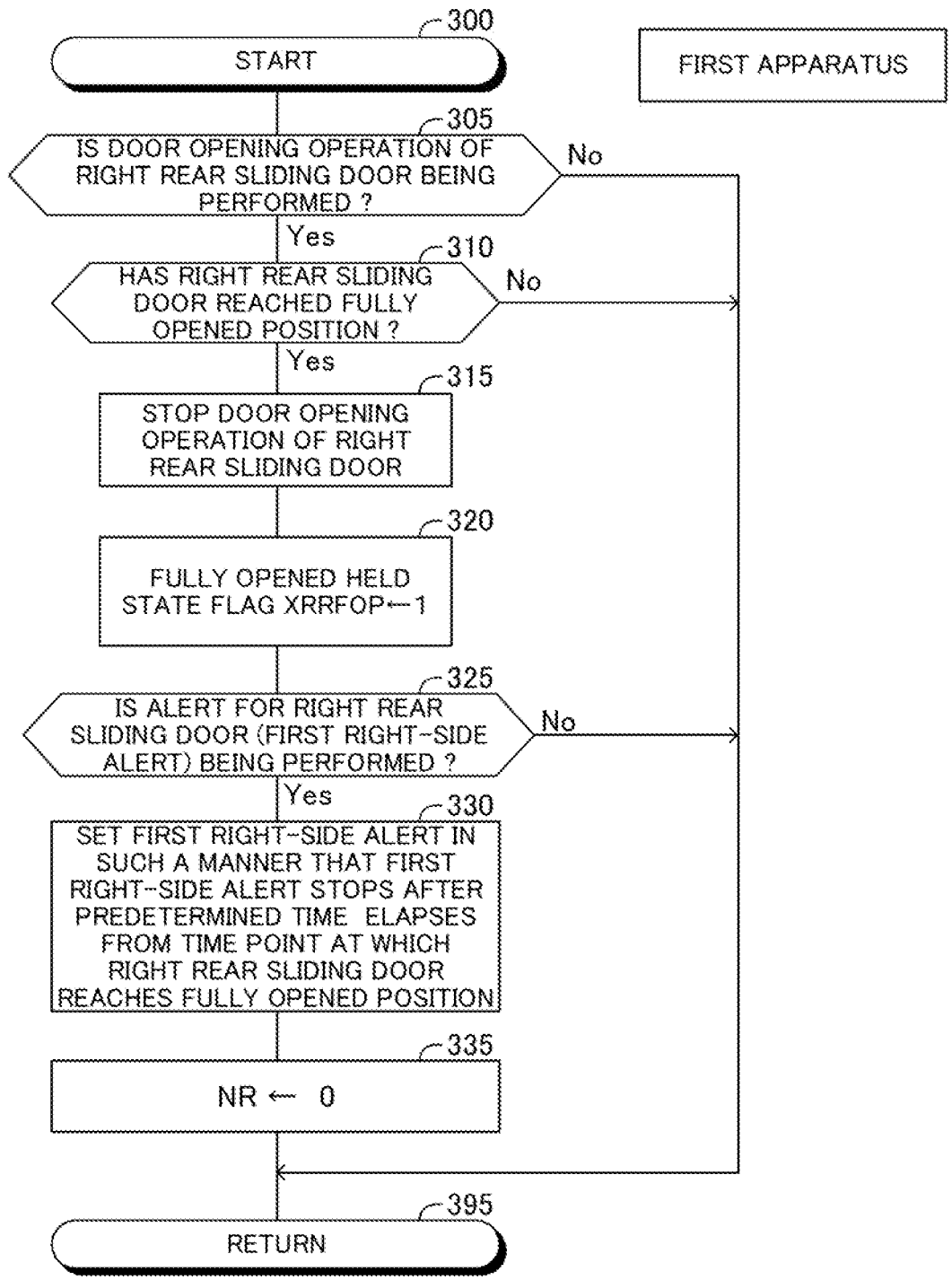
FIG. 3 is a flowchart representing a routine executed by the CPU shown in FIG. 1.
Figure 4:
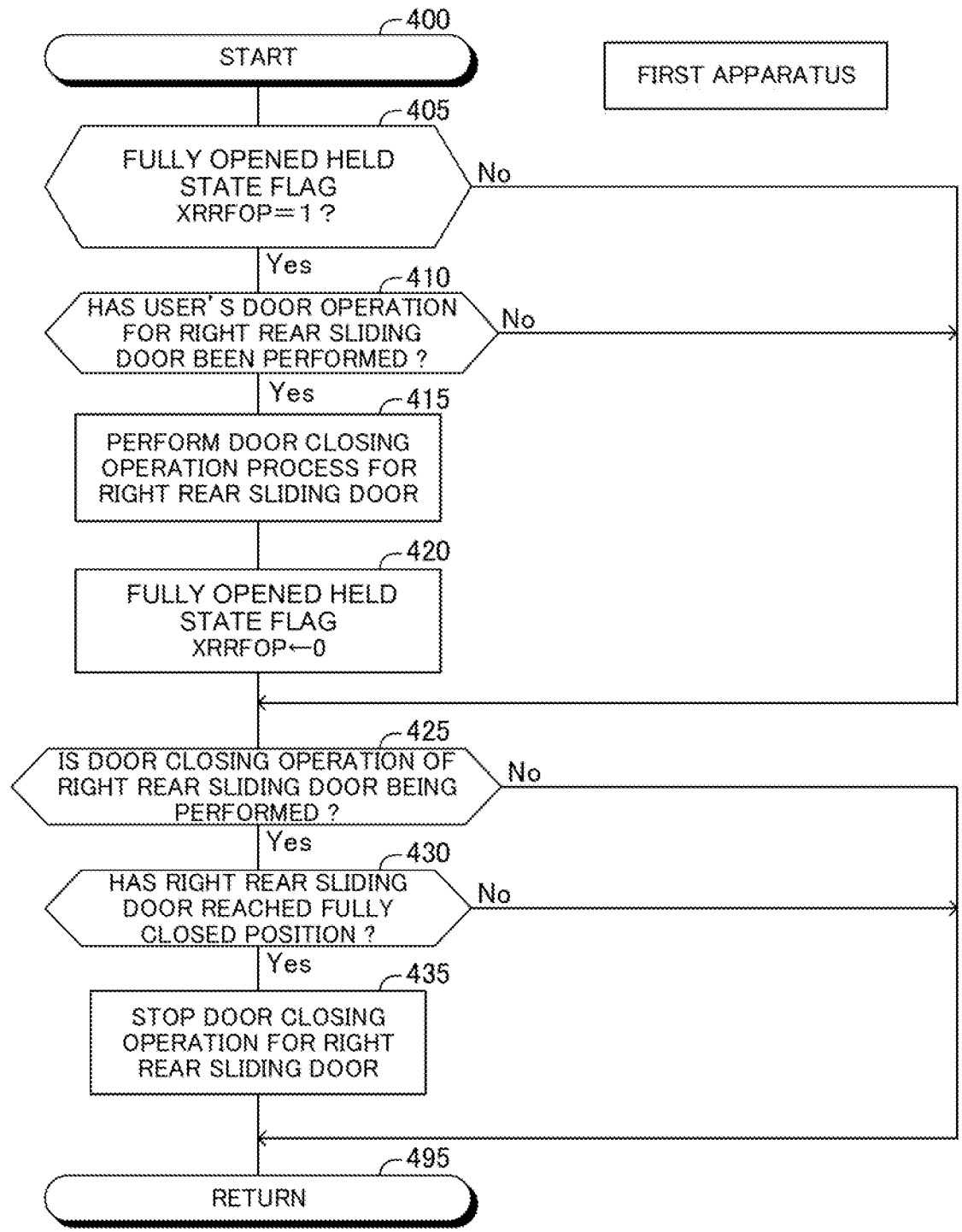
FIG. 4 is a flowchart representing a routine executed by the CPU shown in FIG.

The CPU of the control ECU 20 is configured to execute routines shown by flowcharts in FIGS. 2 to 4, every time a predetermined time elapses.

Therefore, at an appropriate time point, the CPU starts processing from step 200 in FIG. 2 and proceeds to step 205 so as to determine whether or not the right rear sliding door 11RR is at the fully closed position based on the signal from the right courtesy switch 23a. When the right rear sliding door 11RR is not at the fully closed position, the CPU makes a "No" determination at step 205, and proceeds to step 295 directly so as to terminate the present routine tentatively. It should be noted that the CPU may determine whether or not the right rear sliding door 11RR is in the fully closed locked state at step 205.

When the right rear sliding door 11RR is at the fully closed position, the CPU makes a "Yes" determination at step 205 and proceeds to step 210 so as to determine whether or not a door opening operation permission condition is satisfied.

For instance, the door opening operation permission condition is a condition that is to be satisfied when both of the following conditions 1 to 2 are satisfied.

The condition 1: the condition 1 is a condition that is to be satisfied when a power supply unit (not shown) is in a state where the power supply unit can supply the electric power to the electric sliding door device 10.

The condition 2: the condition 2 is a condition that is to be satisfied when the vehicle SV is in a stopped state. For instance, the condition 2 is satisfied when both of the following conditions 2a and 2b are satisfied.

Condition 2a: the condition 2a is a condition that is to be satisfied when either a state where a shift lever (not shown) is positioned at "P" or a state where a stop lamp switch that indicates an operation state of a breaking device is an "ON" state.

Condition 2b: the condition 2b is a condition that is to be satisfied when the vehicle speed of the vehicle SV that is obtained from a vehicle speed sensor (not shown) is "0".

When the door opening operation permission condition is not satisfied, the CPU makes a "No" determination at step 210, and proceeds to step 295 directly so as to terminate the present routine tentatively. In contrast, when the door opening operation permission condition is satisfied, the CPU makes a "Yes" determination at step 210, and proceeds to step 215 so as to determine whether or not the user's door operation for the right rear sliding door 11RR has been performed (i.e., determines whether or not the user's door opening request operation has been detected). When the user's door operation for the right rear sliding door 11RR has not been performed, the CPU makes a "No" determination at step 215, and proceeds to step 295 directly so as to terminate the present routine tentatively.

In contrast, when the user's door operation for the right rear sliding door 11RR has been performed (i.e., the user's door opening request operation for the right rear sliding door 11RR has been detected), the CPU makes a "Yes" determination at step 215, and proceeds to step 220 so as to determine whether or not the attention-required object for the right rear sliding door 11RR is present.

Specifically, in this embodiment, "the attention-required object for the right rear sliding door 11RR" is the object (hereinafter, referred to as a "right approaching object") that is approaching a right side peripheral area within the peripheral area of the vehicle SV. The CPU is configured to detect the object that is approaching the right side peripheral area of the vehicle SV and calculate an approaching prediction time TTC of the detected object based on the radar sensor target object information, through a routine (not shown). The approaching prediction time TTC is calculated by dividing the distance Dr between the object and the right side peripheral area by the relative speed Vr of when the object is approaching the right side peripheral area (TTC=Dr/Vr). Then, when the approaching prediction time TTC is equal to or smaller than a predetermined threshold time Tth, the CPU determines that the right approaching object is present. It should be noted that the right side peripheral area is an area between a "right side surface of the vehicle SV" and a "straight line that extends in parallel to a vehicle front-rear direction and that passes through a position away by a predetermined distance (a few meters) in a right direction of the vehicle SV from the right side surface". A left side peripheral area is an area between a "left side surface of the vehicle SV" and a "straight line that extends in parallel to the vehicle front-rear direction and that passes through a position away by a predetermined distance (a few meters) in the left direction of the vehicle SV from the left side surface".

When the right approaching object is not present, the CPU makes a "No" determination at step 220, and proceeds to step 225 so as to start to perform the door opening operation process for the right rear sliding door 11RR. Thereafter, the CPU proceeds to step 295 so as to terminate the present routine tentatively.

When the right approaching object is present, the CPU makes a "Yes" determination at step 220, and proceeds to step 230 so as to perform a first alert (i.e., a first right-side alert) to thereby alert the user to presence of the right approaching object. Specifically, the CPU activates the buzzer 31 at a first volume in accordance with the first pattern and lights the right side mirror indicator 30*a* in red. In the first pattern, a "pattern in which a buzzer sound is generated for a first ON time T1 and the buzzer sound is not generated for a first OFF time T1" is repeated. It should be noted that the CPU may alert the user by displaying an image representing the presence of the right approaching object on the display 32.

Thereafter, the CPU proceeds to step 235 so as to determine whether or not a value of a right restriction counter NR is smaller than a predetermined threshold number Nth of times (the threshold number of times). The value of the right restriction counter NR represents the number (restriction number) of times of restricting the door opening operation process for the right rear sliding door 11RR. That is, it represents the number (execution number) of times of executing the door opening operation restriction process for the right rear sliding door 11RR. The value of the right restriction counter NR is set to "0" through an initialization routine (not shown) executed by the CPU when an ignition key switch (not shown) of the vehicle SV is changed form an OFF position to an ON position.

When the value of the right restriction counter NR is smaller than the predetermined threshold number Nth of times, the CPU makes a "Yes" determination at step 235, and sequentially executes the processes of steps 240 and 245 described below. Thereafter, the CPU proceeds to step 295 so as to terminate the present routine tentatively.

Step 240: the CPU performs the door opening operation restriction process described above for the right rear sliding door 11RR. Thereby, the user's door operation (the user's door opening request operation) for the right rear sliding door 11RR is ignored, the right rear sliding door 11RR is held at the fully closed position.

Step 245: the CPU increases the value of the right restriction counter NR by "1".

As described above, when the right approaching object is present in a case where there occurs the user's door operation for causing the right rear sliding door 11RR to perform the door opening operation, that user's door operation is ignored and the value of the right restriction counter NR is increased by "1". Therefore, when the user's door operation for causing the right rear sliding door 11RR to perform the door opening operation is continuously/successively performed the predetermined threshold number Nth of times in a case where the right approaching object is present, the value of the right restriction counter NR becomes equal to or larger than the predetermined threshold number Nth of times.

When the CPU proceeds to step 235 in a case where the value of the right restriction counter NR has become equal to or larger than the predetermined threshold number Nth of times, the CPU makes a "No" determination at step 235, and proceeds to step 225 so as to start to perform the door opening operation process for the right rear sliding door 1RR.

At an appropriate timing, the CPU starts processing from step 300 in FIG. 3, and proceeds to step 305 so as to determine whether or not the door opening operation of the right rear sliding door 11RR is being performed (whether or not the right rear sliding door 11RR is being moved in the door opening direction) based on the signal from the rotation position detection sensor of the door drive motor M1a. When the door opening operation of the right rear sliding door 11RR is not being performed, the CPU makes a "No" determination at step 305, and proceeds to step 395 directly so as to terminate the present routine tentatively.

In contrast, when the door opening operation of right rear sliding door 11RR is being performed, the CPU makes a "Yes" determination at step 305, and proceeds to step 310 so as to determine whether or not the right rear sliding door 11RR has reached the fully opened position based on the signal from the rotation position detection sensor of the door drive motor M1a. When the right rear sliding door 11RR has not reached the fully opened position, the CPU makes a "No" determination at step 310, and proceeds to the step 395 directly so as to terminate the present routine tentatively.

When the door opening operation of the right rear sliding door 11RR is continued and then, the right rear sliding door 11RR has reached the fully opened position, the CPU makes a "Yes" determination at step 310, and executes sequentially the processes of steps 315 and step 320 described below. Thereafter, the CPU proceeds to step 325.

Step 315: the CPU stops performing the door opening operation of the right rear sliding door 11RR.

Step 320: the CPU sets a value of a fully opened held state flag XRRFOP to "1". The fully opened held state flag XRRFOP represents that the right rear sliding door 11RR has reached the fully opened position and has been in the fully opened held state (when its value is "1").

The value of the flag XRRFOP is set to through the initialization routine described above.

Step 325: the CPU determines whether or not an alert (in this case, the first right-side alert) for the door opening operation of the right rear sliding door 11RR is being performed:

When the first right-side alert is not being performed, the CPU makes a "No" determination at step 325, and proceeds to step 395 directly so as to terminate the present routine tentatively. In contrast, when the first right-side alert is being performed, the CPU makes a "Yes" determination at step 325, and sequentially executes the processes of steps 330 and 335 described below. Thereafter, the CPU proceeds to step 395 so as to terminate the present routine tentatively.

Step 330: the CPU sets the alert (in this case, the first right-side alert) in such a manner that the first right-side alert stops after a predetermined time elapses from a time point at which the right rear sliding door 11RR reaches the fully opened position. Consequently, the first right-side alert stops after the predetermined time elapses from the time point at which the right rear sliding door 11RR reaches the fully opened position.

Step 335: the CPU sets the value of the right restriction counter NR to "0".

Furthermore, at an appropriate timing, the CPU starts processing from step 400 in FIG. 4, and proceeds to step 405 so as to determine whether or not the value of the fully opened held state flag XRRFOP is "1". When the value of the fully opened held state flag XRRFOP is not "1", the CPU makes a "No" determination at step 405, and proceeds to step 495 directly so as to terminate the present routine tentatively.

In contrast, when the value of the flag XRRFOP is the CPU makes a "Yes" determination at step 405, and proceeds to step 410 so as to determine whether or not the user's door operation for the right rear sliding door 11RR (i.e., the user's door closing operation or the user's door closing request operation) has been performed. When the user's door operation for the right rear sliding door 11RR has not been performed, the CPU makes a "No" determination at step 410 so as to proceed to step 425 directly.

When the user's door operation for the right rear sliding door 11RR has been performed, the CPU makes a "Yes" determination at step 410, and the CPU sequentially executes the processes of steps 415 and 420 described below. Thereafter, the CPU proceeds to step 425.

Step 415: the CPU starts to perform the door closing operation process for the right rear sliding door 11RR.

Step 420: the CPU sets the value of the flag XRRFOP of the right rear sliding door 11RR to "0".

At step 425, the CPU determines whether or not the door closing operation of the right rear sliding door 11RR is being performed (is being moved in the door closing direction) based on the signal from the rotation position detection sensor of the door drive motor M1a. When the door closing operation of the right rear sliding door 11RR is not being performed, the CPU makes a "No" determination at step 425, and proceeds to step 495 directly so as to terminate the present routine tentatively.

In contrast, when the door closing operation of the right rear sliding door 11RR is being performed, the CPU makes a "Yes" determination at step 425, and proceeds to step 430 so as to determine whether or not the right rear sliding door 11RR has reached the fully closed position. When the right rear sliding door 11RR has not reached the fully closed position, the CPU makes a "No" determination at step 430, and proceeds to step 495 directly so as to terminate the present routine tentatively.

Thereafter, when the right rear sliding door 11RR has reached the fully closed position, the CPU makes a "Yes" determination at step 430 so as to stop the door closing operation process for the right rear sliding door 11RR. Thereafter, the CPU proceeds to step 495 so as to terminate the present routine tentatively.

In this manner, when the right approaching object is present, the CPU ignores the user's door opening request operation for the right rear sliding door 11RR the predetermined number of times to thereby restrict the door opening process for the right rear sliding door 11RR.

The CPU performs the door opening operation process and the door closing operation process for the left rear sliding door 11RL in the same manner as the right rear sliding door 11RR. That is, the CPU executes routines shown by flowcharts in FIGS. 5 to 7 that correspond to FIGS. 2 to 4 respectively, every time the predetermined time elapses. Those flowcharts are substantially the same as the flowcharts shown in FIGS. 2 to 4, respectively. Accordingly, detailed explanations on those flowcharts are omitted.

Figure 5:
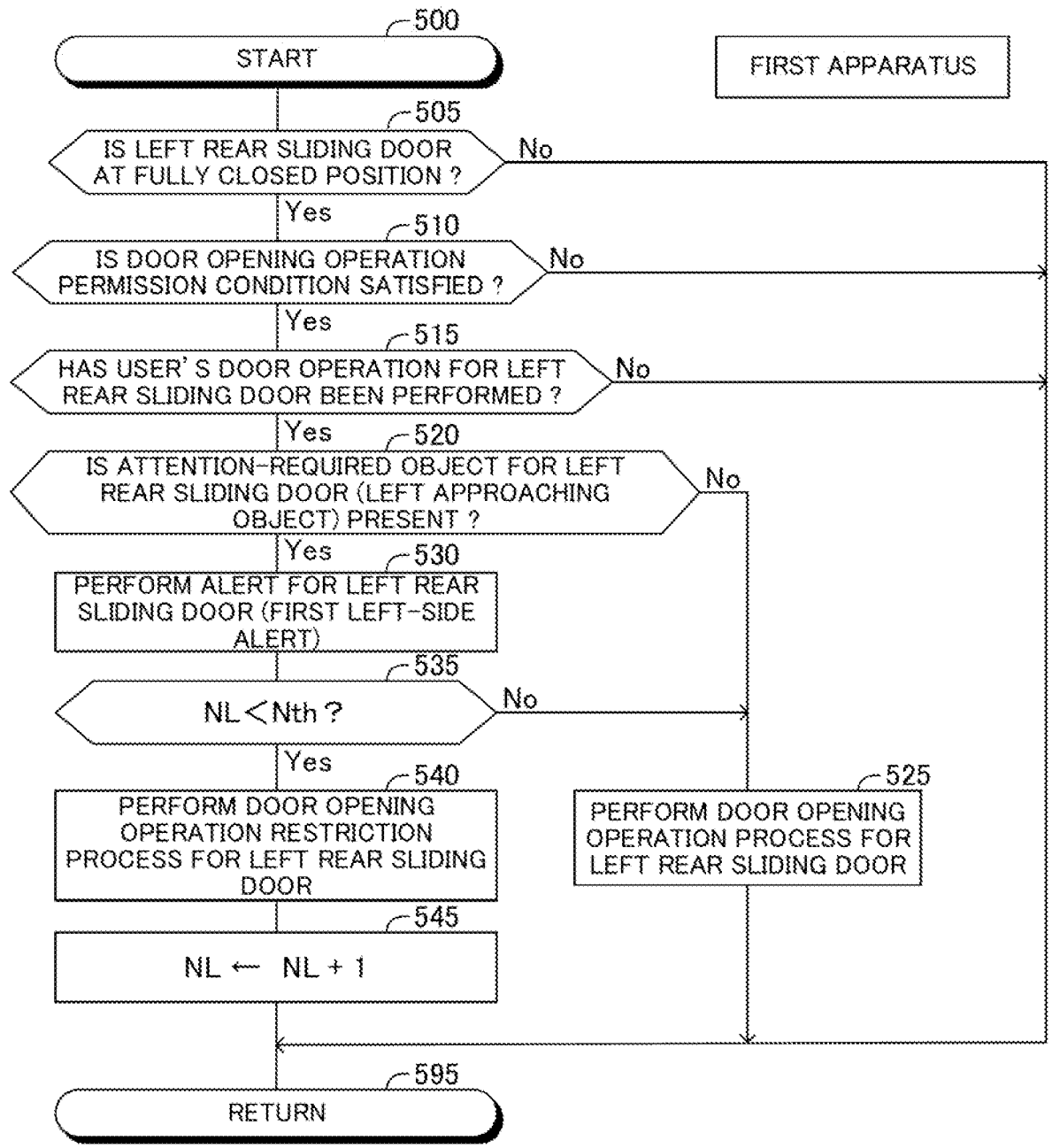
FIG. 5 is a flowchart representing a routine executed by the CPU shown in FIG. 1.
Figure 6:
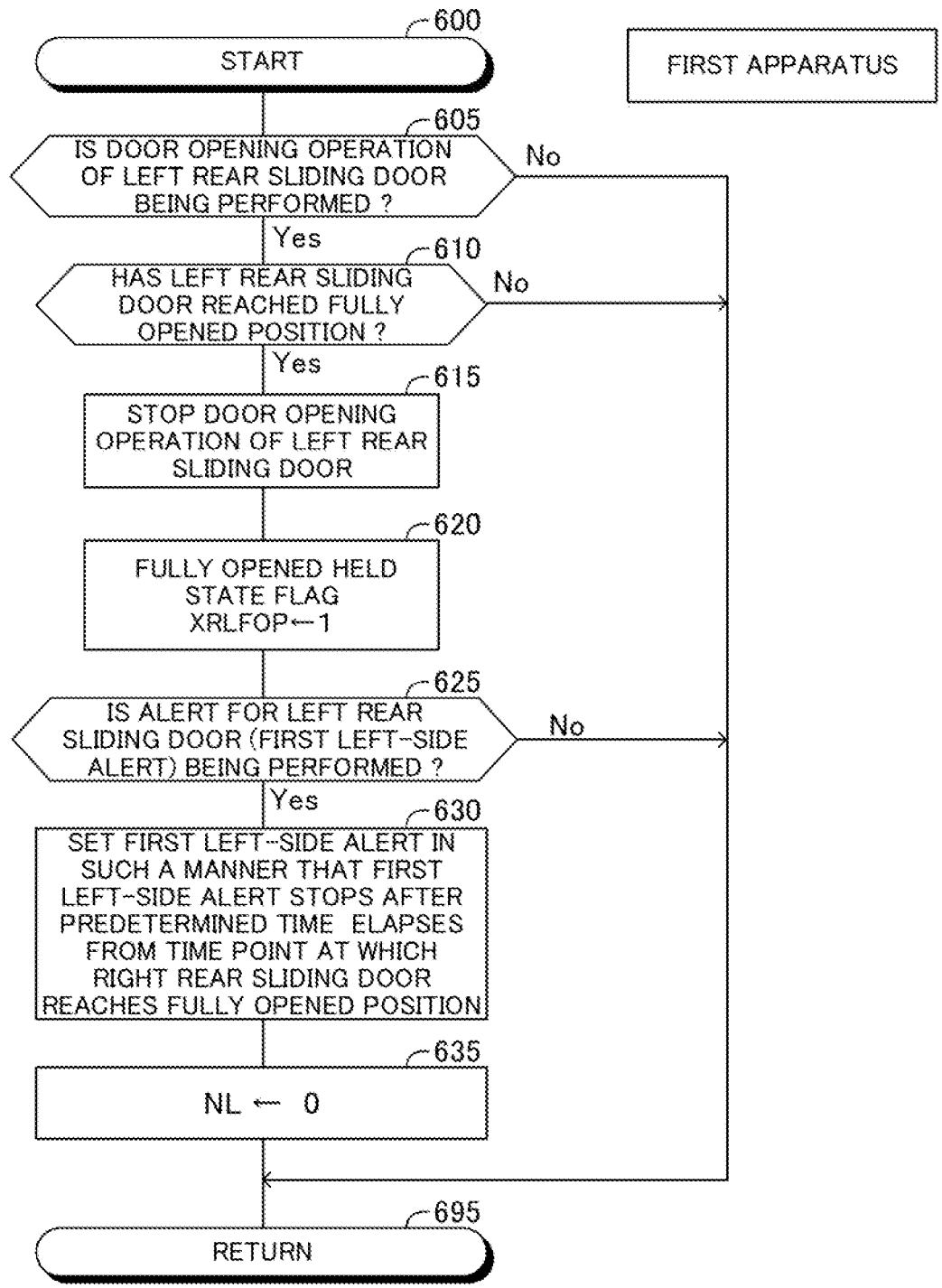
FIG. 6 is a flowchart representing a routine executed by the CPU shown in FIG. 1.
Figure 7:
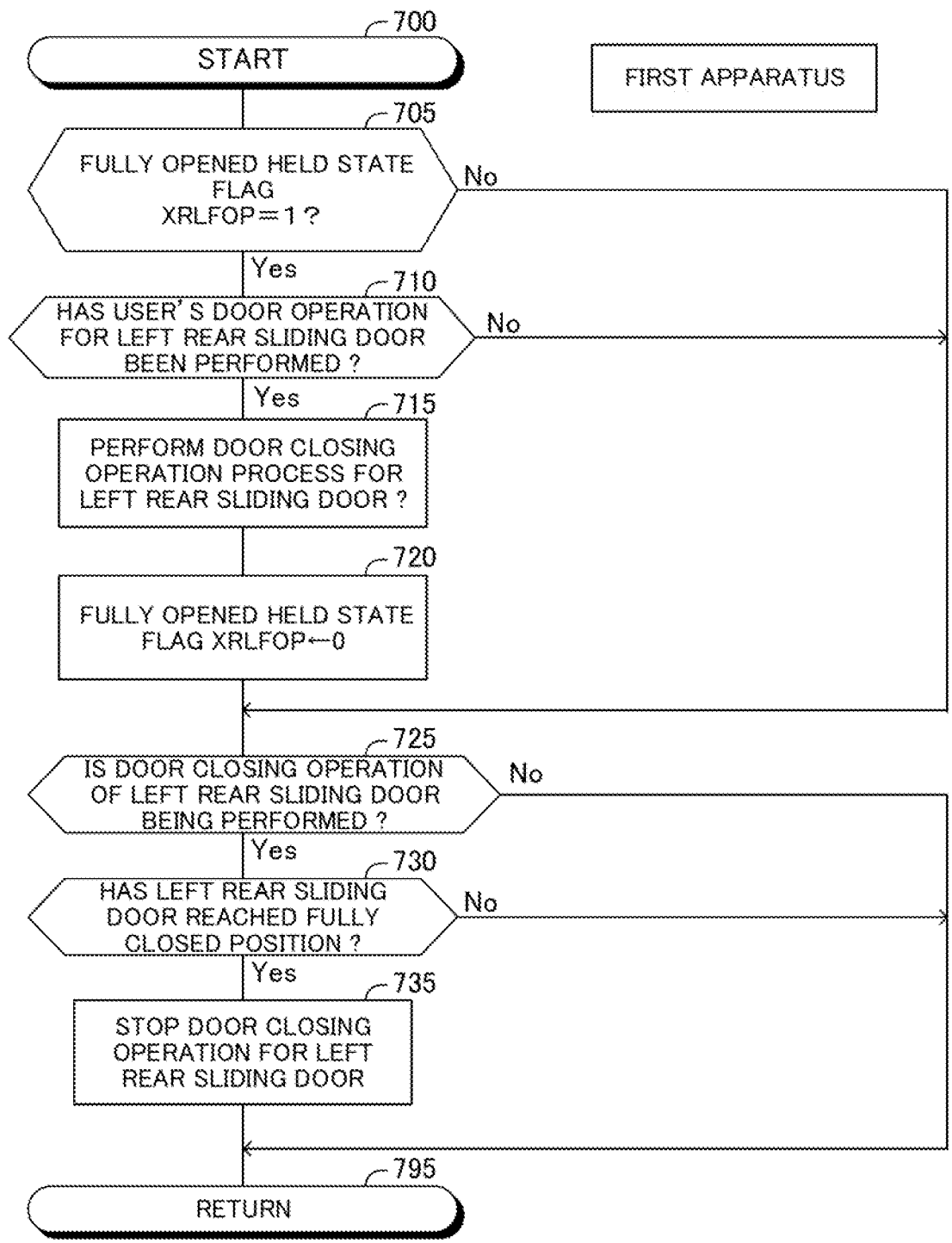
FIG. 7 is a flowchart representing a routine executed by the CPU shown in FIG. 1.

It should be noted that the processes for the right rear sliding door 11RR of FIGS. 2 to 4 are replaced by the processes for the left rear sliding door 11RL, in FIGS. 5 to 7. Furthermore, at step 530 shown in FIG. 5, corresponding to step 230 shown in FIG. 2, the CPU performs the first alert for the door opening operation of the left rear sliding door 11RL to thereby alert the user to presence of a left approaching object (the object that is approaching the left side peripheral area within the peripheral area of the vehicle SV). Specifically, the CPU activates the buzzer 31 at the first volume in accordance with the first pattern and lights the left side mirror indicator 30b. It should be noted that the CPU may display an image indicative of the presence of the left approaching object on the display 32 to thereby alert the user to the presence of the left approaching object. In addition, in FIGS. 5 to 7, the right restriction counter NR in each of FIGS. 2 to 4 is replaced by a left restriction counter NL that represents the restriction number of times of the door opening operation of the left rear sliding door 11RL. Furthermore, in the figures, the flag XRRFOP is replaced by the fully opened held state flag XRLFOP that represents that the left rear sliding door 11RL has reached the fully opened position and has been in the fully opened held state.

Accordingly, when the left approaching object is present, the CPU ignores the users door opening request operation for the left rear sliding door 11RL the predetermined number of times to thereby restrict the door opening process for the left rear sliding door 11RL.

As has been described above, in a case where the attention-required object is continuously detected, the first apparatus holds/keeps the sliding door 11R at the fully closed position until the user performs the user's door opening request operation the predetermined number of times. In the above case, the first apparatus moves the sliding door 11R to the fully opened position when the user performs the user's door opening request operation after the user performs the user's door opening request operation the predetermined number of times. Therefore, the first apparatus can reduce a possibility that the user finds the assistance for leaving the vehicle SV annoying.

Second Embodiment

The assist apparatus (hereinafter, referred to as a "second apparatus") according to a second embodiment of the present disclosure is different from the first apparatus as follows.

The second apparatus performs the first alert (the first right-side alert and/or a first left-side alert) when the restriction of the door opening operation process is being performed in the same manner as the first apparatus.

Whereas, the second apparatus performs a second alert (a second right-side alert and/or a second right-side alert) when it performs the door opening operation after the restriction number of times of the door opening operation reaches the predetermined number of times (the threshold number of times).

<Specific Operation>

Figure 8:
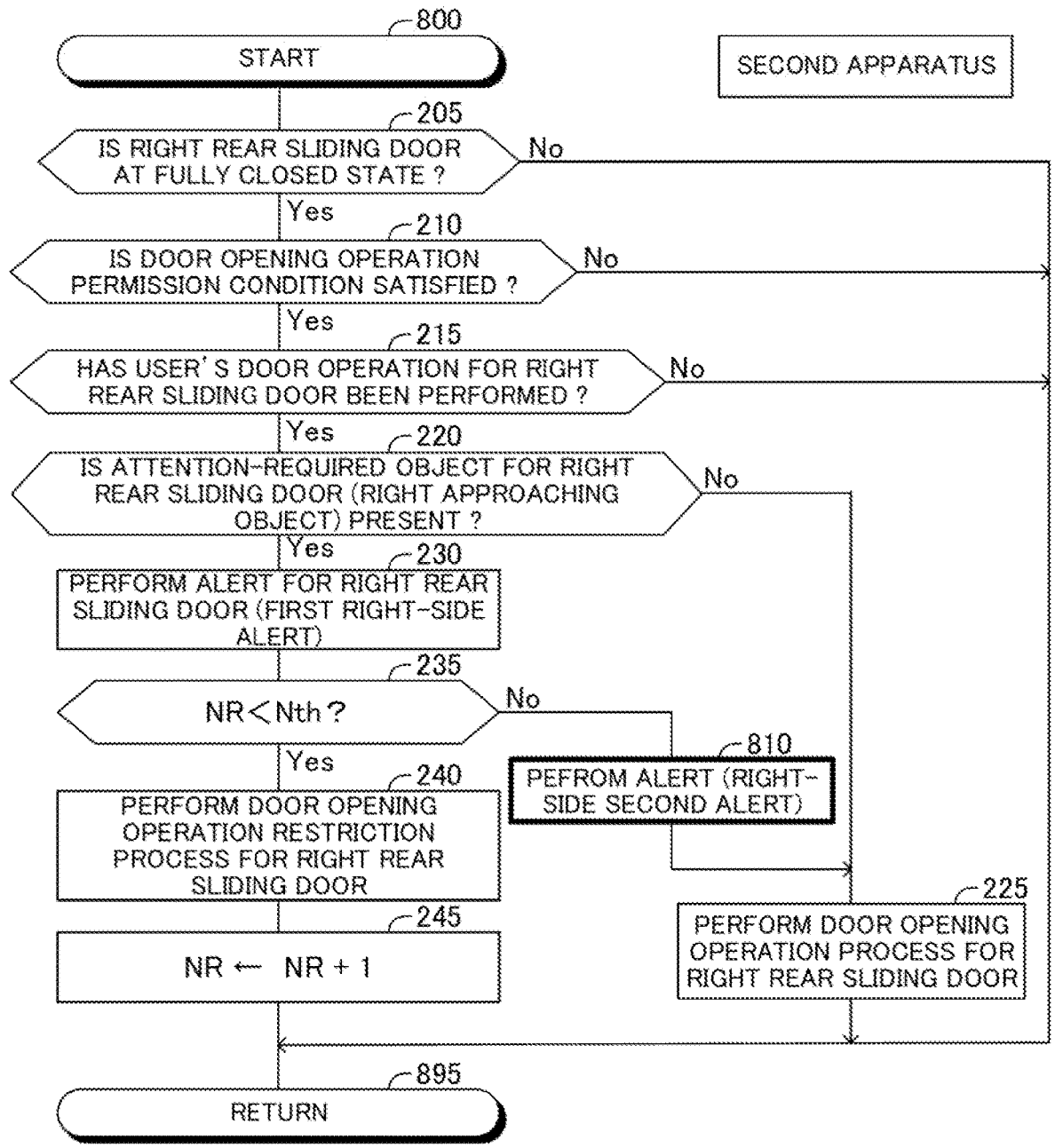
FIG. 8 is a flowchart representing a routine executed by a CPU of a control ECU of an assist apparatus (a second apparatus) for assisting the user of the vehicle to get out of the vehicle according to a second embodiment of the present disclosure.
Figure 9:
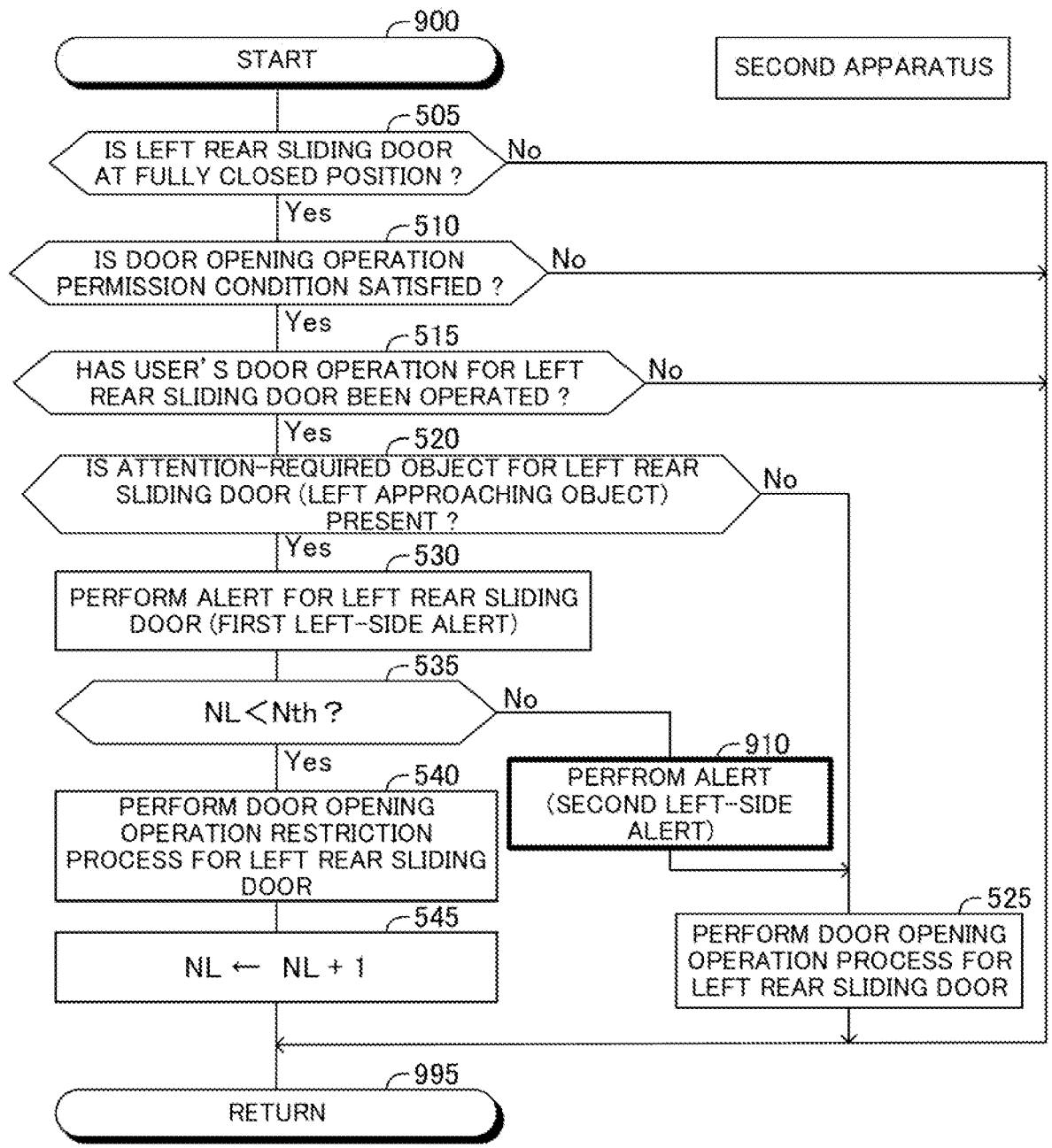
FIG. 9 is a flowchart representing a routine executed by the CPU of the control ECU of the second apparatus.

The CPU executes a routine shown in FIG. 8 instead of the routine of FIG. 2, and executes a routine shown in FIG. 9 instead of the routine of FIG. 5, every time a predetermined time elapses. It should be noted that the routine shown in FIG. 8 is different from the routine shown in FIG. 2 only in that the process of step 810 is added to the routine of FIG. 2. Furthermore, the routine shown in FIG. 9 is different from the routine shown in FIG. 5 only in that the process of step 910 is added to the routine of FIG. 5. Accordingly, those differences will be mainly described, hereinafter.

When the value of the right restriction counter NR is equal to or larger than the predetermined threshold number Nth of times (the threshold number of times) at a time point at which the CPU executes the process of step 235, the CPU makes a "No" determination at step 235 and proceeds to step 810 so as to perform the second alert (i.e., the second right-side alert) in place of the first right-side alert for the right rear sliding door 11RR to thereby alert the user to the presence of the right approaching object. Thereafter, the CPU proceeds to step 225 to start to perform the door opening operation process for the right rear sliding door 11RR.

Alert ability of the second right-side alert is weaker than that of the first right-side alert, but the second right-side alert can still the alert the user. Specifically, when performing the second alert, the CPU activates the buzzer 31 at a "second volume less than the first volume" in accordance with a second pattern, and lights the right side mirror indicator 30a in yellow. It should be noted that, when performing the second alert, the CPU may alert the user by displaying an image indicative of the presence of the right approaching object on the display 32. In the second pattern, a "pattern in which a buzzer sound is generated for the first ON time T1 and the buzzer sound is not generated for a second OFF time T2 longer than the first OFF time T1" is repeated.

It should be noted that the CPU determines whether or not the second right-side alert is being performed at step 325 shown in FIG. 3, and performs a process for stopping the second right-side alert at step 330 shown in FIG. 3.

Similarly, when the value of the left restriction counter NL has been equal to or larger than the predetermined threshold number Nth of times at a time point at which the process of step 535 shown in FIG. 9 is executed, the CPU makes a "No" determination at step 535, and proceeds to step 910 so as to perform the second alert (i.e., the second left-side alert) for the left rear sliding door 11RL in place of the first left-side alert for it. Thereafter, the CPU proceeds to step 525 so as to start to perform the door opening operation process for the left rear sliding door 11RL. The second left-side alert is substantially the same as the second right-side alert, and the alert ability of the second left-side alert is also weaker than that of the first left-side alert.

It should be noted that the CPU determines whether or not the second left-side alert is being performed at step 625 shown in FIG. 6 so as to execute a process for stopping the second left-side alert at step 630.

Accordingly, the second apparatus can reduce a possibility that the user feels annoyed by the alert (the second alert) of when the door opening operation process is performed after the door opening operation restriction process is performed.

The present disclosure is not limited to the above-described embodiments, and can employ various modifications within the scope of the present disclosure. For instance, in each of the above-described embodiments, the restriction of the door opening operation process performed when the attention-required object is present may simultaneously be executed for all of automatic doors of the vehicle SV. For instance, in each of the above-described embodiments, the predetermined threshold number Nth of times may be one time or a plurality of times (e.g., two times, three times, or four times).

The door to which the modification according to the present disclosure is applied s not limited to the sliding door 11R. Thus, the present disclosure may be applied to a swing door that swings around the axis of rotation. In this case, the door drive motor device 12 may have a motor that swings (rotates) the swing door. Furthermore, the vehicle SV described above has both of the right rear sliding door 11RR and the left rear sliding door 11RL as the rear doors, however, the vehicle SV may be a vehicle that has only one of them as the rear door.

The door to which the modification according to the present disclosure is applied may be a door having an actuator that is provided in between the perimeter of the door opening part and the door that opens and closes the door opening part. The actuator may be an actuator that opens and closes the door by expanding and contracting in the axial direction. This type of actuator is well-known and applied to a vehicle backdoor.

For instance, each of the above-described embodiments may be configured to obtain the peripheral object information using the other surrounding sensors (e.g., the camera sensors) in addition to the radar sensors 21 so as to detect the attention-required object based on the obtained peripheral object information. Each of the above-described embodiments may be configured to obtain the peripheral object information using the other surrounding sensors (e.g., the camera sensors) in place of the radar sensors 21 to detect the attention-required object based on the obtained peripheral object information. Furthermore, the attention-required object is not limited to the above-described "the right side approaching object and/or the left side approaching object. For instance, as the attention-required object for the right side approaching object, an object that is present in an area that is much wider (larger) than the above-described right side approaching area (regardless of the approaching prediction time TTC) may be used. Likewise, as the attention-required object for the left side approaching object, an object that is present in an area that is much wider (larger) than the above-described left side approaching area (regardless of the approaching prediction time TTC) may be used. Furthermore, in each of the above-described embodiments, the first alert and/or the second alert may be the alert using voice (messages). The driver's seat operation switch 22b may include a right opening operation switch operated for opening the right rear sliding door 11RR, the right closing operation switch operated for closing the right rear sliding door 11RR, the left opening operation switch operated for opening the left rear sliding door 11RL, and the left closing operation switch operated for closing the left rear sliding door 11RL.

What is claimed is:

1. An assist apparatus for assisting a user of a vehicle to get out of said vehicle, said assist apparatus comprising:
    a door drive device configured to perform door opening operation for opening a door automatically, wherein said door is configured to open and close a door opening part formed in a body of said vehicle, and wherein said user gets in said vehicle through the door opening part and gets out of said vehicle through the door opening part;
    an operation detection device configured to detect a user's door opening request operation performed by said user for opening said door in a case where said door is at a fully closed position to fully close said door opening part;
    an information acquisition device configured to obtain peripheral object information on an object present in a peripheral area of said vehicle; and
    a control unit configured to control said door drive device, wherein,
    said control unit is configured to:
    determine, based on said peripheral object information, whether or not an attention-required object to which said user should pay attention is present in a case where said user gets out of said vehicle through said door opening part;
    perform a door opening operation process to cause said door drive device to perform said door opening operation based upon a determination that said attention-required object is not present in a case where said user's door opening request operation has been detected;
    perform a door opening operation restriction process to hold said door at said fully closed position based upon a determination that said attention-required object is present in a case where said user's door opening request operation has been detected; and
    perform said door opening operation process in place of said door opening operation restriction process even based upon a determination that said attention-required object is present in a case where said user's door opening request operation is detected after said door opening operation restriction process has been successively performed a predetermined number of times.

2. The assist apparatus according to claim 1, further comprising an alert device capable of performing either a first alert or a second alert selectively, each of said first alert and said second alert having alert ability of alerting said user to presence of said attention-required object, said alert ability of said second alert being lower than that of said first alert,
    wherein,
    said control unit is configured to:
    cause said alert device to perform said first alert while performing said door opening operation restriction process; and
    cause said alert device to perform said second alert while performing said door opening operation process in place of said door opening operation restriction process.

* * * * *